(12) United States Patent
Ryu

(10) Patent No.: US 6,194,333 B1
(45) Date of Patent: Feb. 27, 2001

(54) DIELECTRIC COMPOSITION FOR PLASMA DISPLAY PANEL

(75) Inventor: Byung Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/299,602

(22) Filed: Apr. 27, 1999

(30) Foreign Application Priority Data

Apr. 30, 1998 (KR) .................................. P98-15612

(51) Int. Cl.[7] .................. C03C 3/16; C03C 3/17; C03C 3/21; C03C 14/00
(52) U.S. Cl. .................. 501/32; 501/45; 501/46; 501/48
(58) Field of Search .................. 501/17, 18, 22, 501/24, 26, 32, 45, 48, 46; 428/688, 689, 701, 702

(56) References Cited

U.S. PATENT DOCUMENTS

| | | | |
|---|---|---|---|
| 4,547,467 | * 10/1985 | Barth et al. | 501/20 |
| 4,593,006 | * 6/1986 | Takabatake et al. | 501/32 |
| 4,624,934 | * 11/1986 | Kokubu et al. | |
| 4,883,705 | * 11/1989 | Kawakami et al. | 501/32 |
| 5,179,047 | * 1/1993 | Chiba | 501/14 |
| 5,242,867 | * 9/1993 | Lin et al. | 501/32 |
| 5,674,634 | * 10/1997 | Wang et al. | 501/21 |
| 5,849,649 | * 12/1998 | Poole | 501/24 |

FOREIGN PATENT DOCUMENTS

| | | | |
|---|---|---|---|
| 157327 | * 11/1982 | (DD) . | |
| 1369240 | * 10/1974 | (GB) | 501/45 |
| 8-321257 | * 12/1996 | (JP) . | |
| 9-231910 | * 9/1997 | (JP) . | |
| 11-011979 | * 1/1999 | (JP) . | |

* cited by examiner

Primary Examiner—Mark L. Bell
Assistant Examiner—David Sample
(74) Attorney, Agent, or Firm—Fleshner & Kim, LLP

(57) ABSTRACT

A dielectric composition for a plasma display panel that is capable of satisfying the required characteristics of a dielectric applied to an barrier rib and a dielectric layer of a plasma display panel. The dielectric composition includes a parent glass of $P_2O_5$—$PbO$—$K_2O$ group and an oxide filler. The dielectric has relatively low sintering temperature and dielectric constant, a high reflectivity and a reduced amount of PbO component, so that it can minimize an environment contamination and reduce a weight of the device.

9 Claims, 7 Drawing Sheets

DIELECTRIC COMPOSITION FOR PLASMA DISPLAY PANEL

BACKGROUND OF THE INVENTION

1. Field of the Invention

This invention relates to a PDP (plasma display panel) More particularly the present invention relates to dielectric composition and method for forming the composition, such composition used for mading a dielectric layer or a barrier rib of the PDP.

2. Description of the Prior Art

PDP has been considered the most suitable large size FPD (flat panel display) since the process making the PDP panel is easier than any other FPD.

FIG. 1 shows a structure of the PDP cell arranged in a matrix pattern in the conventional AC type PDP. The PDP discharge cell includes an upper plate having a sustaining electrode pair 12A and 12B, an upper dielectric layer 14 and a protective layer 16 that are sequentially formed on an upper substrate 10, and a lower plate having an address electrode 20, a lower dielectric layer 22, an barrier rib 24 and phospher 26 that are sequentially formed on a lower substrate 30. The upper substrate 10 and the lower substrate 18 are facing each other and a discharge cell is defined by these substrates and the barrier ribs 24. One of the sustain eletrode pair 12A, 12B is also used for a scan eletrode applying scan pulses for scanning the panel. The upper dielectric layer 14 is accumulating an electric charge. The protective lyaer 16 prevents the upper dielectric layer 14 from demaging by sputtering so that it may increase a life of PDP and improve an emission efficiency. Mgo is uaually used for the protective layer 16. The upper and lower substrates 10 and 18 are aligned so that the address eletrode 20 is cross to the sustain electrodes 12A, 12B. Data signals are applied to the address electrode 20 in order to select the cell which is to be displayed. The barrier rib 24 prevents the adjacent cells from leaking ultraviolet rays produced by the electrical discharge. The phosphor is coated on the lower dielectric layer 22 ane the barrier ribs 24 so as to genarate red, green or blue visible ray.

The PDP discharge cell having a structure as described above maintains a discharge by a face discharge between the sustaining electrode pair 12A and 12B after being selected by an opposite discharge between the address electrode 20 and the scanning/sustaining electrode 12A. In the PDP discharge cell, the fluorescent body 26 is radiated by an ultraviolet ray generated during the sustained discharge, thereby emitting a visible light to the outer side of the discharge cell. As a result, the PDP having discharge cells display a picture.

FIG. 2 explains a process of manufacturing the barrier rib 24 shown in FIG. 1 step by step. Referring to FIG. 2, in step S2, parent glass powder and oxide filler powder, which are materials of the barrier rib, are mixed to prepare mixture powder. In this case, fine powder of less than 100 $\mu$m is made after the parent glass powder and the oxide filler powder are mixed at a predetermined ration. Next, in step S4, a paste state to be used for the screen printing method or a slurry state to be used for the tape casting method is made by mixing the mixture powder with an organic vehicle. In step S6, by making use of the paste or the slurry, the barrier rib 24 is formed on the lower dielectric layer 22 defined on the lower substrate 18. In this case, the barrier rib 24 is made by the screen printing method, the sand blast method, the etching method, the additive method, the stamping method and so on. This will be described in detail later.

Subsequently, in step S8, the barrier rib 24 formed in the step S6 is dried for 15 to 20 minutes at a temperature range of 300° C. to 500° C. to remove the organic vehicle and thereafter is sintered at a temperature range of 550° C. to 600° C., to thereby complete the barrier rib 24.

FIG. 3a to FIG. 3d are sectional views for representing a process of manufacturing the barrier rib making use of the screen printing method. Referring now to FIG. 3a, there is shown a structure in which the lower dielectric layer 22 and the glass paste patterns 28 are disposed on the lower substrate 18. The glass paste patterns 28 are formed by coating a glass paste prepared by mixing the glass powder, which is mixed by the parent glass and the filler, with the organic vehicle on the lower dielectric layer 22 at a desired thickness using the screen printing method and thereafter by drying the same during a desired time. Then, a process of forming the glass paste patterns 28 as mentioned above is repeatedly performed about seven to eight times as shown in FIG. 3b and FIG. 3c. As a result, the glass paste patterns 28 are disposed at a desired height, for example, a height of 150 to 200 $\mu$m. The glass paste patterns disposed in this manner are sintered to provide the barrier ribs 24 having a desired height on the lower dielectric layer 22 as shown in FIG. 3d.

FIG. 4a to FIG. 4f are sectional views for representing a process of manufacturing the barrier rib making use of the sand blast method. After a glass paste 30 is coated on the lower dielectric layer 22 formed on the lower substrate 18 as shown in FIG. 4a, a photo resistor 32 is coated on the glass paste 30 as shown in FIG. 4b. Next, as shown in FIG. 4c, mask patterns 34 are positioned on the photo resistor 32 which is exposed to a light through openings of the mask patterns 34 in turn. Subsequently, after the mask patterns 34 are removed, an non-exposed portion of the photo resistor 32 is removed to form photo resistor patterns 32A as shown in FIG. 4D. Then, glass paste patterns 30A are formed in the same shape as the photo resister patterns 32A as shown in FIG. 4E by removing the exposed glass paste 30 through the photo resistor patterns 32A using the sand blast method. Consequently, the barrier ribs 24 are provided on the lower dielectric layer 22 as shown in FIG. 4f by sintering the glass paste patterns 30A after removing the photo resistor patterns 32A.

FIG. 5a to FIG. 5c are sectional views for representing a process of manufacturing the barrier rib making use of the etching method. As shown in FIG. 5a, a paste 34 sensitive to a light is coated on the dielectric layer 22 disposed on the lower substrate 18. Then, as shown in FIG. 5b, mask patterns 36 are positioned on the sensitive paste 34 which is exposed to a light through the mask patterns 36. Consequently, the barrier ribs 24 are made as shown in FIG. 4c by removing the mask patterns 36 and then etching a non-exposed portion of the sensitive paste 34 and thereafter by sintering the non-etched portion of the sensitive paste 34.

FIG. 6a to FIG. 6e are sectional views for representing a process of manufacturing the barrier rib making use of the additive method. As shown in FIG. 6a, a photo resistor 38 is coated on the lower dielectric layer 22 disposed on the lower substrate 18. Then, as shown in FIG. 6b, mask patterns 40 are positioned on the photo resistor 38 which is exposed to a light through the mask patterns 40. Subsequently, the mask patterns 40 are removed and then the exposed portion of the photo resistor 38 is removed to thereby form photo resistor patterns 38A as shown in FIG. 6c. Next, as shown in FIG. 6d, glass pastes 30 are coated between the photo resistor patterns 38A and then dried. Consequently, the barrier ribs 24 are provided on the lower dielectric layer 22 as shown in FIG. 6e by removing the photo resistor patterns 38A and thereafter by sintering the glass paste 30.

FIG. 7a to FIG. 7d are sectional views for representing a process of manufacturing the barrier rib making use of the stamping method. As shown in FIG. 7a, a glass paste 42 is coated on the lower dielectric layer 22 disposed on the lower substrate 18. Then, as shown in FIG. 7b, a mold 44 with holes for the barrier ribs is positioned on the glass paste 42 which is stamped by applying a desired pressure to the mold 44, thereby forming glass paste pattern 42A conforming to the hole shape of the mold 44. Consequently, the mold 44 is separated and then the glass paste patterns 42A are sintered as shown in FIG. 7c to thereby provide the barrier ribs 24 on the lower dielectric layer 22 as shown in FIG. 7d.

The barrier rib 24 which can be made by the above-mentioned various methods serves to increase a brightness of the PDP by reflecting a rear light emitting from the fluorescent body layer 26 along with the lower dielectric layer 22. Accordingly, the lower dielectric layer 22 and the barrier rib 24 requires a dense organization to have a high reflexiblity. Also, the lower dielectric layer 22 and the barrier rib 24 needs a low dielectric factor for improving a response characteristic of the elements, a low expansive coefficient and a thermal stability for preventing a crack, and a low sintering temperature for preventing a crack in the lower substrate 18 at the time of sintering. To this end, a same series of parent glass and oxide filler are used for the lower dielectric layer 22 and the barrier rib 24. For example, as a material of the barrier rib 24 is used a glass-ceramics material in which oxide filler powder consisting of $TiO_2$ and $Al_2O_3$ is mixed with parent glass powder of $PbO$—$B_2O_3$—$ZnO$ group or $PbO$—$B_2O_3$—$SiO_2$ group containing a large amount of Pbo component. More specifically, a composition and a component ratio of the parent glass included in a material of the conventional barrier rib 24 are indicated in the following Table:

TABLE 1

| MATERIAL | COMPOSITION | COMPONENT RATIO (WEIGHT %) |
|---|---|---|
| PARENT GLASS | PbO | 60–80 |
| | $B_2O_3$ | 10–20 |
| | $SiO_2$ | 2–10 |
| | $Al_2O_3$ | 0.1–4.5 |
| FILLER | $Al_2O_3$ | 95–100 |
| | $TiO_2$ | 0–5 | wherein the component ratio of the parent glass composition is calculated assuming that a weight of the barrier rib be 100 weight %, and the component ratio of the filler composition also is calculated assuming that a weight of the barrier rib be 100 weight %. As seen from the Table 1, $PbO$—$B_2O_3$—$ZnO$ group or $PbO$—$B_2O_3$—$SiO_2$ group containing the PbO having a large weight of 60 to 80% is used for a parent glass for the conventional barrier rib. $TiO_2$ in the oxide filler serves to increase the reflective factor and the crystallization of the barrier rib 24. Specifically, since a refractive index of the parent glass proportional to the reflective factor thereof is 1.4 to 1.5 while a refractive index of $TiO_2$ is 2.7, $TiO_2$ becomes an important factor increasing the reflexibility of the barrier rib. Also, $TiO_2$ improves the crystallization of the barrier rib to thereby increase the reflexibility thereof. Meanwhile, $Al_2O_3$ in the oxide filler serves to reduce the thermal expansive coefficient of the barrier rib 24. The following Table 2 represents a characteristic of the barrier rib 24 to which a composition having the component ratio as indicated in the Table 1 is applied.

TABLE 2

| GLASS-CERAMICS | SINTERING TEMPERATURE | DIELECTRIC CONSTANT (1 MHz) | THERMAL EXPANSIVE COEFFICIENT | REFLECTIVITY (400 nm) |
|---|---|---|---|---|
| PARENT GLASS (40–70%) + FILLER (30–60%) | 580–600° C. | 13–15 | 70–80 × $10^{-7}$° C. | 50–60 |

However, such a material of the barrier rib 24 has a problem in that, because it has a high dielectric constant equal to 13 to 15, a response speed of the element is delayed. Also, as described above, the barrier rib 24 is formed on the lower substrate 18 and then sintered together with the lower substrate 18. In this case, since the conventional material of the barrier rib 24 has a high sintering temperature, the lower substrate 18 is deformed and damaged at the time of sintering. Furthermore, the conventional material of the barrier rib 24 gives rise to an environment contamination due to PbO occupying a high weight and increases the weight of elements.

SUMMARY OF THE INVENTION

Accordingly, it is an object of the present invention to provide a dielectric composition for a plasma display panel that is capable of satisfying optical, thermal and electrical characteristic.

Further object of the present invention is to provide a dielectric composition for a plasma display panel that is capable of preventing an environment contamination caused by PbO by making use of a parent glass with a low component ratio of PbO.

In order to achieve these and other objects of the invention, a dielectric composition for a plasma display panel according to one aspect of the present invention includes a parent glass of $P_2O_5$—$PbO$—$K_2O$ group, and an oxide filler.

A dielectric composition for a plasma display panel according to another aspect of the present invention includes a parent glass, and an oxide filler consisting of at least one of 30 to 90 weight % $Al_2O_3$, 5 to 15 weight % $V_2O_5$, 5 to 10 weight % $TiO_2$, 0 to 20 weight % $Mg_2Al_3(AlSi_5O_{18})$ and 0 to 20 weight % LiAl ($Si_2O_6$).

A dielectric composition for a plasma display panel according to still another aspect of the present invention includes a parent glass of $P_2O_5$—$PbO$—$K_2O$ group, and an oxide filler consisting of at least one of 30 to 90 weight % $Al_2O_3$, 5 to 15 weight % $V_2O_5$, 5 to 10 weight % $TiO_2$, 0 to 20 weight % $Mg_2Al_3(AlSi_5O_{18})$ and 0 to 20 weight % LiAl ($Si_2O_6$).

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
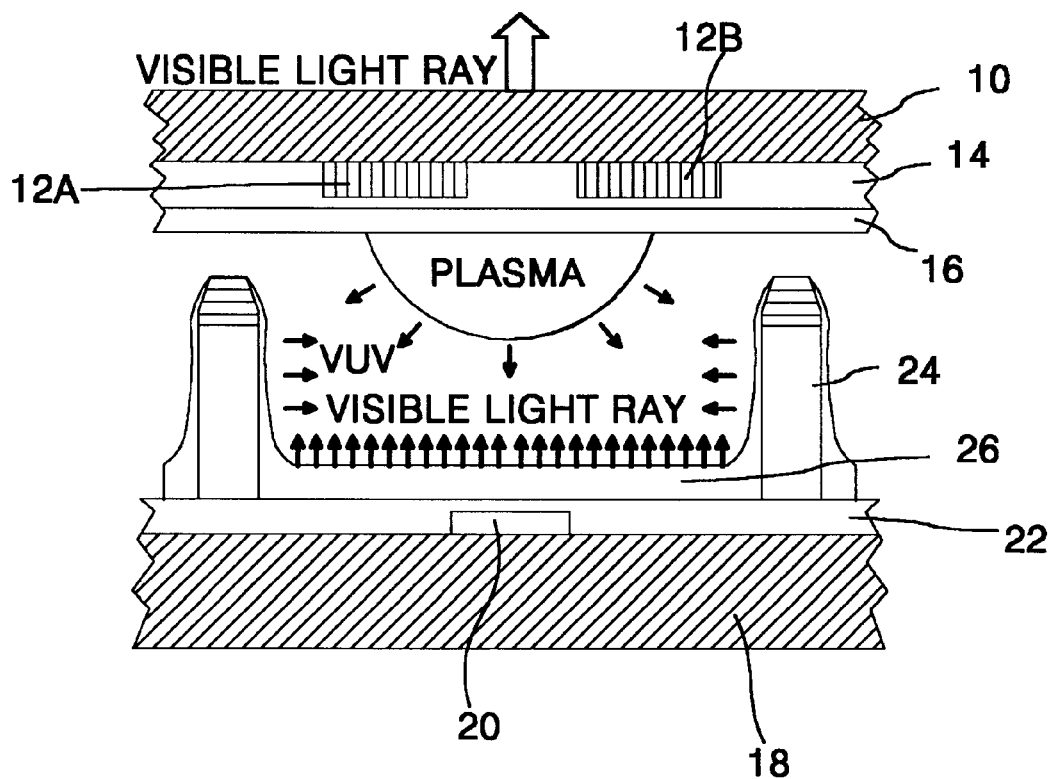
FIG. 1 is a sectional view showing the structure of a discharge cell in the conventional plasma display panel.

A dielectric composition for a PDP according to an embodiment of the present invention is applied to an barrier rib and a dielectric layer of a lower plate and which includes a parent glass of $P_2O_5$—PbO—$K_2O$ group and an oxide filler. In this case, an example of the detailed composition and component ratio of the parent glass of $P_2O_5$—PbO—$K_2O$ group and the oxide filler is indicated in the following Table:

TABLE 3

| MATERIAL | COMPOSITION | WEIGHT % |
|---|---|---|
| PARENT GLASS | $P_2O_5$ | 45–65 |
|  | $K_2O$ | 5–20 |
|  | PbO | 10–35 |
|  | ZnO | 1–7 |
|  | MgO | 1–4 |
|  | BaO | 1–4 |
|  | CaO | 0–4 |
|  | $Na_2O$ | 0–5 |
|  | $V_2O_5$ | 0–4 |
|  | $Al_2O_3$ | 0–4 |
| OXIDE FILLER | $TiO_2$ | 5–10 |
|  | $Al_2O_3$ | 30–90 |
|  | $Mg_2Al_3$ ($AlSi_5O_{18}$) | 0–25 |
|  | $V_2O_5$ | 5–15 |
|  | LiAl ($Si_2O_6$) | 0–20 |

In Table 3, a component ratio of the $P_2O_5$—PbO—$K_2O$ group parent glass composition is given assuming that a weight of the parent glass be 100 weight %; while a component ratio of the oxide filler composition is given assuming that a weight of the oxide filler be 100 weight %. In such a dielectric composition, $TiO_2$ is added along with $V_2O_5$ for the sake of improving the crystallization of the dielectric to thereby increase a reflectivity of the dielectric. Also, $Al_2O_3$ and an oxide compound is added for the purpose of reducing an electric constant of the dielectric material and controlling a thermal expansive coefficient thereof. Specifically, a filler with a low thermal expansive coefficient, such as $Al_2O_3$ and an oxide compound, is mixed with a parent glass having a thermal expansive coefficient of 120 to $140 \times 10^{-7\circ}$ C., so that a dielectric material having a thermal expansive coefficient ranged in 70 to $850 \times 10^{-7\circ}$ C. can be obtained in accordance with the mixed ratio. In Table 3, each of the oxide filler compositions $TiO_2$, $Al_2O_3$, $Mg_2Al_3$ ($AlSi_5O_{18}$), $V_2O_5$ and LiAl ($Si_2O_5$) can be added to the parent glass, but it may be added selectively depending on the required characteristic of the dielectric.

The characteristic of a dielectric to which a composition as indicated in the Table 3 is applied is described in the following Table:

TABLE 34

| GLASS-CERAMICS | SINTERING TEMPERATURE | DIELECTRIC CONSTANT (1 MHz) | THERMAL EXPANSIVE COEFFICIENT | REFLECTIVITY (400 nm) |
|---|---|---|---|---|
| PARENT GLASS (40–80%) + FILLER (20–60%) | 530–580° C. | 7–10 | 70–85 × $10^{-7\circ}$ C. | 50–55 |

Herein, a dielectric applied with a composition according to the present invention includes a parent glass of 40 to 80 weight % and a filler of 20 to 60 weight %. It can be seen from the Table 4 that a sintering temperature of the dielectric applied with a composition according to the present invention is 530 to 580° C., which is lower than that of an barrier rib, that is, a dialectic applied with the conventional composition, as indicated in the Table 2, equal to 580 to 600° C. Also, it can be seen from the Table 4 that a dielectric constant of the dielectric is 7 to 10, which is lower than that of the conventional dielectric, as indicated in the Table 2, equal to 13 to 15 as indicated in Table 2. It can be seen from the Table 4 that a reflectivity of the dielectric is 50 to 55, which is lower than that of the conventional dielectric, as indicated in the Table 2, equal to 50 to 60. It can be seen that a thermal expansive coefficient of the dielectric in the Table 4 is 70 to $85 \times 10^{-7\circ}$ C., which is equal to that of the conventional dielectric in the Table 2. As a result, the dielectric composition according to the present invention includes a parent glass of $P_2O_5$—PbO—$K_2O$ group so that it can obtain characteristics of thermal stability and low dielectric constant. Also, it makes use of a parent glass with a low PbO component to thereby minimize problems such as an environment contamination and so on.

Figure 2:
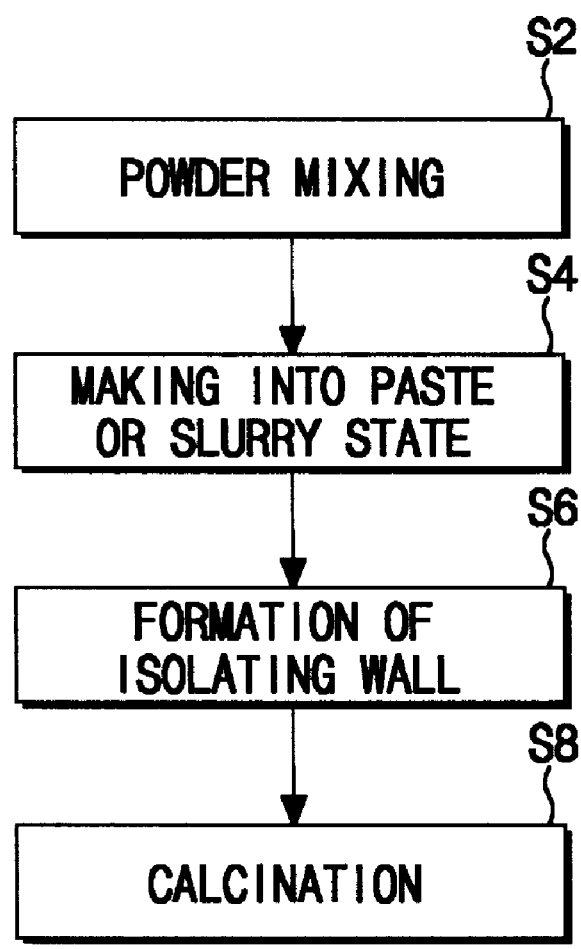
FIG. 2 is a flow chart for explaining a general method of manufacturing an barrier rib.
Figure 3A:
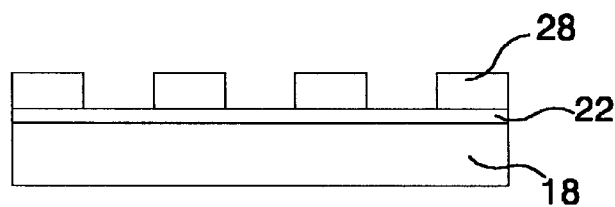
FIG. 3a to FIG. 3d are sectional views showing a method of manufacturing the barrier rib using the screen printing method step by step.
Figure 3B:
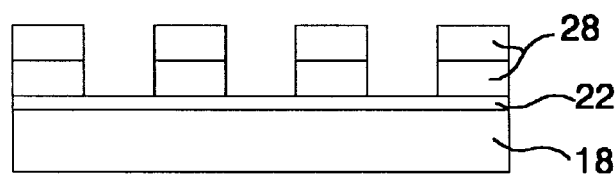
Figure 3C:
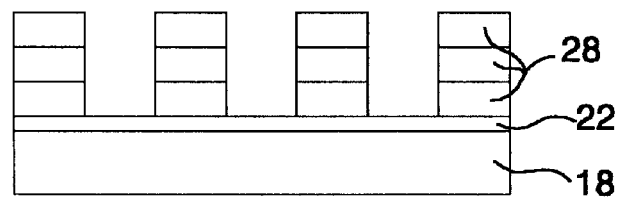
Figure 3D:
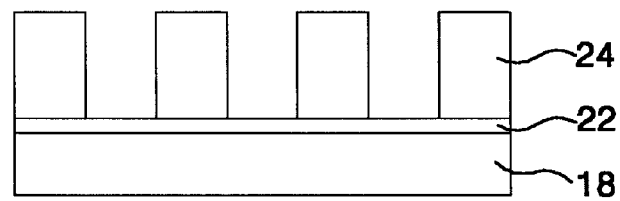
Figure 4A:
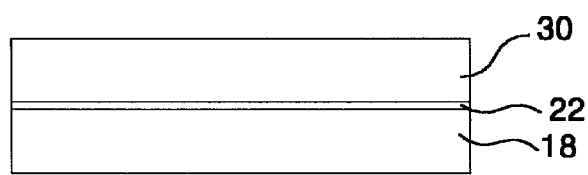
FIG. 4a to FIG. 4f are sectional views showing a method of manufacturing the barrier rib using the sand blast method step by step.
Figure 4B:
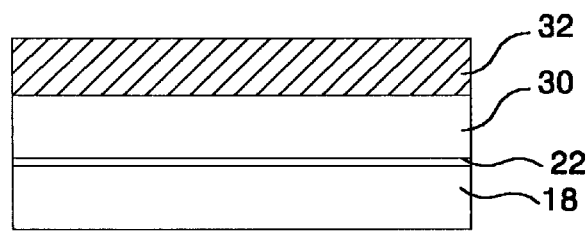
Figure 4C:
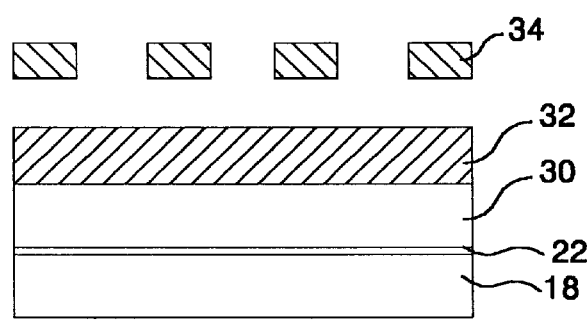
Figure 4D:
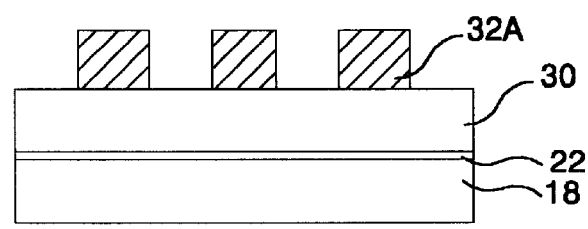
Figure 4E:
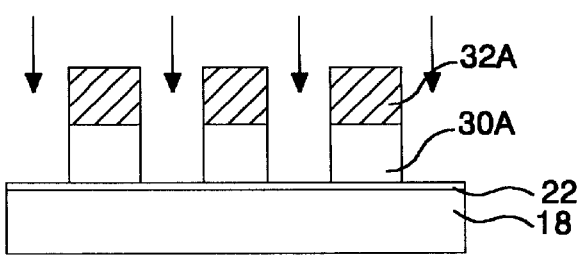
Figure 4F:
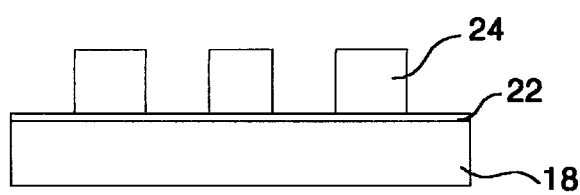
Figure 5A:
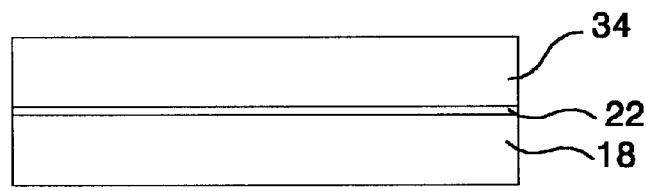
FIG. 5a to FIG. 5c are sectional views showing a method of manufacturing the barrier rib using the etching method step by step.
Figure 5B:
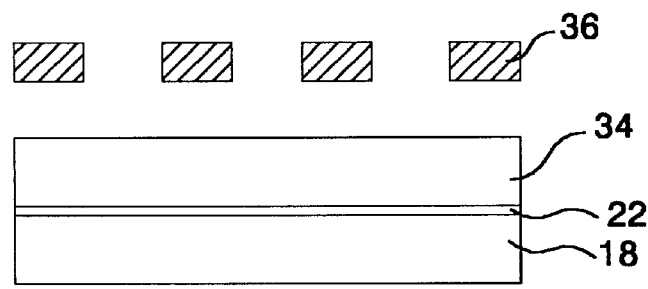
Figure 5C:
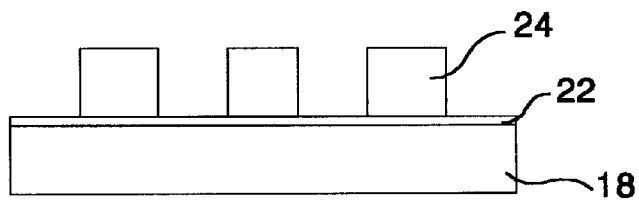
Figure 6A:
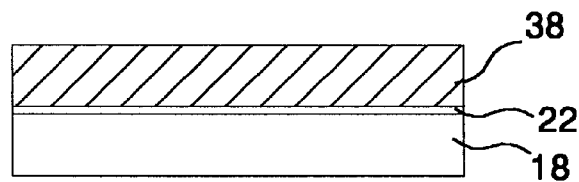
FIG. 6a to FIG. 6e are sectional views showing a method of manufacturing the barrier rib using the sand blast method step by step.
Figure 6B:
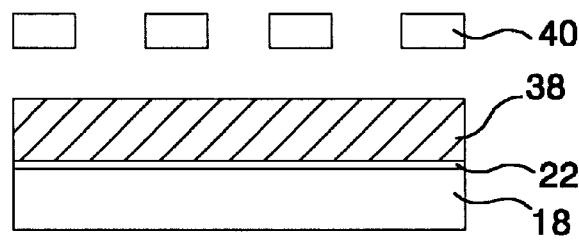
Figure 6C:
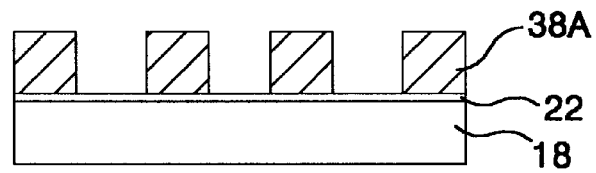
Figure 6D:
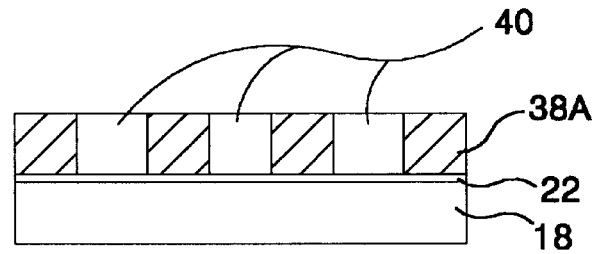
Figure 6E:
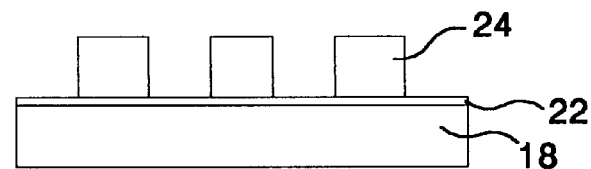
Figure 7A:
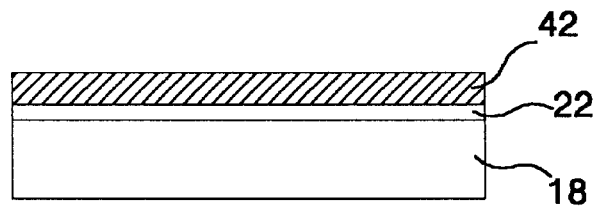
FIG. 7a to FIG. 7d are sectional views showing a method of manufacturing the barrier rib using the stamping method step by step.
Figure 7B:
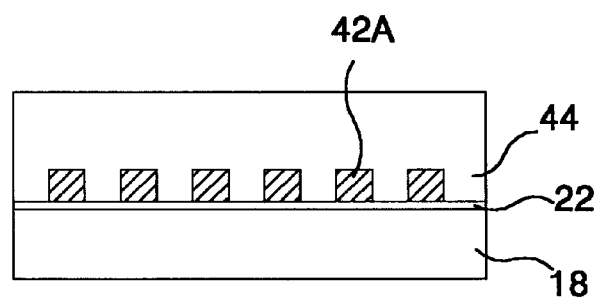
Figure 7C:
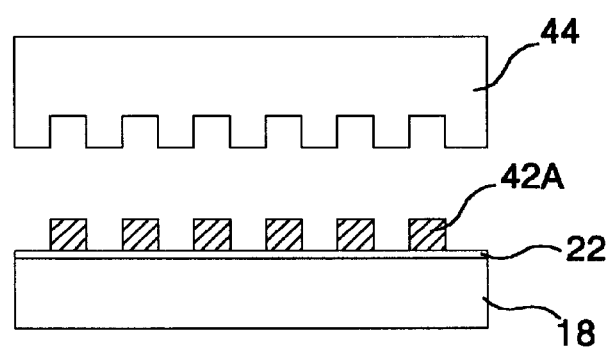
Figure 7D:
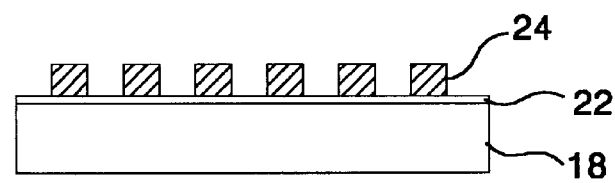

A method of manufacturing an barrier rib applied with a dielectric composition including a $P_2O_5$—PbO—$K_2O$ group parent glass and an oxide filler according to the present invention will be described below with reference to FIG. 2.

First, in step S2, glass-ceramics powder is prepared by mixing $P_2O_5$—PbO—$K_2O$ group parent glass powder and oxide filler powder. As for a manufacturing process of the $P_2O_5$—PbO—$K_2O$ group parent glass powder, raw materials of each parent glass component as indicated in the Table 3 are weighed in accordance with a predetermined component ratio and then mixed during a desired time by means of a tumbling mixer. Next, the mixed raw materials are melted by means of an electric melting furnace. In this case, with respect to a melting condition, a temperature range is set to about 1000 to 1200° C. and a melting time is set to about 1 to 5 hours. In order to keep a uniformity, the melted glass is stirred several times by means of a stirrer to have a dense organization. Then, the melted glass is suddenly cooled by means of a quenching roller to thereby make glass cullets. The glass cullets is milled for 16 hours using the ball milling method and then passed into #170 and #270 sievers in turn, thereby making parent glass powder in which an average article size has a granularity of less than 10 μm. As for a milling condition, the filled amount of a milling jar is set to 250 g, the unit number of a ball-type cylinder is 44 EA/jar, the milling time is set to 16 hours, and 2 ml of IPA solution is used as a lubricant. Filler powder having a component ratio as indicated in the Table 3 is added, by 20 to 60 weight %, to the parent glass powder made by the above-mentioned procedure to prepare glass-ceramics powder. In this case, the parent glass powder is mixed with the oxide filler powder for about 7 hours at the tumbling mixer and then the mixed powder is put into a dry oven of 150° C. and be dried for about more than 2 hours, thereby preparing the glass-ceramics powder.

Subsequently, in step S4, the glass-ceramics material prepared in the step S2 is mixed with an organic vehicle to make a screen printing slurry or a tape casting slurry. In this case, the mixed ratio of the glass-ceramics powder to the organic vehicle is preferably 70 to 30, which can be controlled depending on the types of parent glass powder and oxide filler. As the organic vehicle is used a mixture in which butyl carbitol acetate (BCA), butyl carbitol (BC) and ethyl cellulose (EC) are mixed at a predetermined ratio. Since the EC changes a viscosity of the paste or the slurry to have influence on the rheology and the sintering characteristic, a mixed ratio of the EC is preferably 10%, a mixed ratio of the BCA is preferably 60% and a mixed ratio of the BC is preferably 20%. A viscosity of the screen printing paste is preferably a range of about 70,000 to 100,000 cps while a viscosity of the tape casting slurry is preferably a range of about 700 to 1,000 cps. Herein, vicosities of the paste and the slurry can be adjusted differently depending on the thick film process.

In step S6, an barrier rib is formed on the lower dielectric disposed on the lower substrate by the paste or the slurry made in the step S4. In this case, the barrier rib is formed by utilizing any one of the above-mentioned barrier rib manufacturing methods.

Consequently, in step S8, the barrier rib is sintered to complete its manufacturing. In this case, the lower substrate on which the barrier rib is formed is dried for about 20 minutes and then the barrier rib is sintered by means of a heating furnace, thereby completing the barrier rib. At this time, a sintering temperature of the barrier rib is usually determined by a crystallization temperature obtained from a result of differential thermal analysis (DTA) of the mixed powder. It is desirable that the mixed powder according to an embodiment of the present invention is sintered for about 15 to 30 minutes at a sintering temperature of 530 to 580° C.

As described above, the dielectric composition for the PDP according to the present invention includes the $P_2O_5$—PbO—$K_2O$ group parent glass to thereby allow the dielectric to have a relatively low dielectric constant, so that it can a response speed of the device. Also, the dielectric composition for the PDP according to the present invention includes the $P_2O_5$—PbO—$K_2O$ group parent glass to increase the reflexibility, so that it can improve the brightness. Furthermore, the dielectric composition for the PDP according to the present invention includes the $P_2O_5$—PbO—$K_2O$ group parent glass to reduce a sintering temperature and a thermal expansive coefficient, so that it can prevent a crack of the dielectric as well as a deformation or a crack of the lower substrate. Moreover, the dielectric composition for the PDP according to the present invention includes a parent glass with a reduced PbO component, so that it is capable of minimizing problems of an environment contamination, etc. caused by PbO as well as reducing a weight of the PDP device.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A dielectric composition for a plasma display panel, comprising:
    a parent glass of $P_2O_5$—PbO—$K_2O$ group which includes 45 to 65 weight % $P_2O_5$, 10 to 35 weight % PbO, 5 to 20 weight % $K_2O$, 1 to 7 weight % ZnO, 1 to 4 weight % MgO, 1 to 4 weight % BaO, 0 to 4 weight % CaO, 0 to 5 weight % $Na_2O$, 0 to 4 weight % $V_2O_5$, and 0 to 4 weight % $Al_2O_3$; and
    an oxide filler.

2. The dielectric composition as claimed in claim 1, wherein the dielectric composition is any one of an upper dielectric layer, a lower dielectric layer or a barrier rib of the plasma display panel.

3. A dielectric layer composition for a plasma display panel, comprising:
    a parent glass; and
    an oxide filler including 5 to 15 weight % $V_2O_5$ and at least one of 30 to 90 weight % $Al_2O_3$, 5 to 10 weight % $TiO_2$, 0 to 20 weight % $Mg_2Al_3$ ($AlSi_5O_{18}$) and 0 to 20 weight % LiAl ($Si_2O_6$).

4. The dielectric composition as claimed in claim 3, wherein the dielectric composition is any one of an upper dielectric layer, a lower dielectric layer or a barrier rib of the plasma display panel.

5. A dielectric composition for a plasma display panel, comprising:
    a parent glass; and
    an oxide filler comprising 30 to 90 weight % $Al_2O_3$, 5 to 15 weight % $V_2O_5$, and 5 to 10 weight % $TiO_2$.

6. The dielectric composition as claimed in claim 7, wherein the parent glass includes 45 to 65 weight % $P_2O_5$, 10 to 35 weight % PbO, 5 to 20 weight % $K_2O$, 1 to 7 weight % ZnO, 1 to 4 weight % MgO, 1 to 4 weight % BaO, 0 to 4 weight % CaO, 0 to 5 weight % $Na_2O$, 0 to 4 weight % $V_2O_5$, and 0 to 4 weight % $Al_2O_3$.

7. The dielectric composition as claimed in claim 5, wherein the dielectric composition is any one of an upper dielectric layer, a lower dielectric layer or a barrier rib of the plasma display panel.

8. The dielectric composition as claimed in claim 5, wherein the parent glass is of $P_2O_5$—PbO—$K_2O$ group and the oxide filler further comprises 0 to 20 weight % $Mg_2Al_3$ ($AlSi_5O_{18}$) and 0 to 20 weight % LiAl ($Si_2O_6$).

9. A dielectric composition for a plasma display panel, comprising:
    a parent glass of $P_2O_5$—PbO—$K_2O$ group including 45 to 65 weight % $P_2O_5$, 10 to 35 weight % PbO, 5 to 20 weight % $K_2O$, 1 to 7 weight % ZnO, 1 to 4 weight % MgO, 1 to 4 weight % BaO, 0 to 4 weight % CaO, 0 to 5 weight % $Na_2O$, 0 to 4 weight % $V_2O_5$, and 0 to 4 weight % $Al_2O_3$; and
    an oxide filler including at least one of 30 to 90 weight % $Al_2O_3$, 5 to 15 weight % $V_2O_5$, 5 to 10 weight % $TiO_2$, 0 to 20 weight % $Mg_2Al_3$ ($AlSi_5O_{18}$) and 0 to 20 weight % LiAl ($Si_2O_6$).

* * * * *